(12) United States Patent
Nagai et al.

(10) Patent No.: US 8,960,775 B2
(45) Date of Patent: Feb. 24, 2015

(54) STRUCTURE FOR SIDE PORTION OF VEHICLE BODY

(71) Applicant: Honda Motor Co., Ltd., Minato-ku, Tokyo (JP)

(72) Inventors: Shigeyuki Nagai, Wako (JP); Kenichi Kitayama, Wako (JP); Yasunori Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/368,845

(22) PCT Filed: Nov. 13, 2012

(86) PCT No.: PCT/JP2012/079347
§ 371 (c)(1),
(2) Date: Jun. 26, 2014

(87) PCT Pub. No.: WO2013/099456
PCT Pub. Date: Jul. 4, 2013

(65) Prior Publication Data
US 2014/0354012 A1  Dec. 4, 2014

(30) Foreign Application Priority Data

Dec. 28, 2011 (JP) ................................. 2011-289081

(51) Int. Cl.
| | |
|---|---|
| *B62D 27/02* | (2006.01) |
| *B60J 10/08* | (2006.01) |
| *B62D 25/04* | (2006.01) |
| *B60R 13/06* | (2006.01) |
| *B62D 25/06* | (2006.01) |

(52) U.S. Cl.
CPC ............. *B62D 25/04* (2013.01); *B60R 13/06* (2013.01); *B62D 27/023* (2013.01); *B60J 10/083* (2013.01); *B62D 25/06* (2013.01)
USPC .............. 296/193.05; 296/193.06; 296/146.9; 296/29

(58) Field of Classification Search
USPC ......... 296/203.03, 193.06, 193.05, 29, 146.9; 49/489.1
See application file for complete search history.

(56) References Cited

U.S. PATENT DOCUMENTS 5,964,496 A * 10/1999 Nozaki et al. .............. 296/146.9
7,431,378 B2 * 10/2008 Chen et al. ................... 296/102

(Continued)

FOREIGN PATENT DOCUMENTS

| | | |
|---|---|---|
| JP | S49-21227 | 5/1974 |
| JP | S60-178282 U | 11/1985 |
| JP | 11-227632 A | 8/1999 |
| JP | 11-348821 A | 12/1999 |

(Continued)

*Primary Examiner* — Jason S Morrow
(74) *Attorney, Agent, or Firm* — Carrier Blackman & Associates, P.C.; William D. Blackman; Joseph P. Carrier

(57) ABSTRACT

The center pillar outer member (36) of a center pillar (22) which supports a roof (17) is halved into a center pillar outer upper section (37) and a center pillar outer lower section (38). The center pillar outer member (36) is provided with a connection recess (41) at which the center pillar outer lower section (38) is joined to the center pillar outer upper section (37), and is also provided with a seal member (42) which covers the connection recess (41). The seal member (42) continues to the front upper seal (43) and the rear upper seal (44), respectively, of a front door opening seal (31) and a rear door opening seal (33), the front and rear upper seals (43, 44) extending along a roof side rail (24).

5 Claims, 8 Drawing Sheets

(56) References Cited

U.S. PATENT DOCUMENTS

| | | | |
|---|---|---|---|
| 2006/0290168 A1* | 12/2006 | Morikawa et al. | 296/146.16 |
| 2011/0233970 A1* | 9/2011 | Nagai et al. | 296/203.03 |
| 2012/0299334 A1* | 11/2012 | Takayama et al. | 296/193.06 |
| 2014/0152053 A1* | 6/2014 | Watanabe et al. | 296/193.06 |

FOREIGN PATENT DOCUMENTS

| | | |
|---|---|---|
| JP | 2001-322506 A | 11/2001 |
| JP | 2011-088494 A | 5/2011 |
| JP | 2011-195107 A | 10/2011 |

* cited by examiner

STRUCTURE FOR SIDE PORTION OF VEHICLE BODY

TECHNICAL FIELD

The present invention relates to a vehicle body side structure including a seal member for covering a coupling recessed portion formed on a surface of a vehicle by coupling a plurality of outer panels.

BACKGROUND ART

Among this type of vehicle body side structures, there is a structure for coupling a portion extending from a roof to an upper portion of a center pillar. A center pillar is plastically formed as a separate body by using a high tension steel plate, a roof rail is plastically formed by using a normal steel plate, and a vehicle body outer panel coupling portion couples the center pillar and the roof rail near the roof rail (e.g., refer to Patent Literature 1).

There is also a vehicle body in which coupled portions are covered. In this vehicle body, respective pillars such as a center pillar are divided into upper and lower two portions. Stepped portions are formed at boundary portions where the upper portions and the lower portions are coupled and seal tape is stuck to the stepped portion, with which a seal member provided to a door comes in contact, out of the stepped portions (e.g., refer to Patent Literature 2).

However, an outward appearance of the vehicle body side structure disclosed in Patent Literature 1 is not good, because a step is formed by a plate material laid on the coupling portion between the upper portion of the center pillar and the roof rail or a welding mark remains.

In the vehicle body side structure disclosed in Patent Literature 2, the seal tape is stuck only to a position corresponding to the seal member provided to the door and therefore seal tape does not exist at the remaining stepped portions.

In this manner, the stepped portions formed at the coupling portions are exposed and remain, which detracts from visual quality. If large seal tape adapted to the remaining stepped portions is used to cover the remaining stepped portions, thin edges of the seal tape (seal member) corrugate and it is difficult to carry out the operation. Moreover, the thin edges of the seal tape (seal member) may not uniformly come in contact, which may detract from visual quality.

PRIOR ART LITERATURE

Patent Literature

Patent Literature 1: JP 2011-195107 A
Patent Literature 2: JP 2011-88494 A

SUMMARY OF INVENTION

Technical Problem

It is an object of the present invention to provide a vehicle body side structure which improves visual quality, even when a center pillar outer member or panel is divided into two portions, and facilitates a mounting operation of a seal member.

Solution to Problem

According to a first aspect of the present invention, there is provided a vehicle body side structure in which a center pillar outer member of a center pillar supporting a roof of a vehicle body is divided into two portions, i.e., a center pillar outer member upper portion and a center pillar outer member lower portion and a front door opening seal and a rear door opening seal corresponding to a front door and a rear door are mounted to a roof side rail continuous from the center pillar and the roof and extending in a front-back direction of the vehicle body, the vehicle body side structure including: a coupling recessed portion where the center pillar outer member lower portion is coupled to the center pillar outer member upper portion; and a seal member for covering the coupling recessed portion, wherein the seal member is continuous with a front upper seal and a rear upper seal, along the roof side rail, of the front door opening seal and the rear door opening seal.

In a second aspect of the invention, preferably, the seal member includes a main body portion facing the coupling recessed portion, a first lip portion continuous with the main body portion and to be laid on an outer face of the center pillar outer member upper portion, and a second lip portion continuous with the main body portion and to be laid on an outer face of the center pillar outer member lower portion, a front door seal on a side of the door and extending along the center pillar outer member comes in close contact with the center pillar outer member, a seal line area of the seal member is formed to have a smooth surface shape without steps from the main body portion to a tip end of the first lip portion and a tip end of the second lip portion and between the tip ends and the center pillar outer member, and a remaining tip end other than the tip ends in the seal line area is formed to be thick-walled.

In a third aspect of the invention, the seal member is preferably stuck to the coupling recessed portion.

In a fourth aspect of the invention, the seal member preferably has one end pinched by the front door opening seal and the other end pinched by the rear door opening seal.

In a fifth aspect of the invention, preferably, the center pillar outer member lower portion has a recessed portion formed by pressing an upper portion of the center pillar outer member lower portion toward a vehicle interior, the center pillar outer member upper portion has a roof rail coupling T-shaped portion continuous with the recessed portion, extending in a longitudinal direction of the roof side rail, and coupled to an outer face of a stiffener which is provided inside a roof rail outer plate of the roof side rail and which has a closed section, the coupling recessed portion is formed by coupling a stepped portion, formed by bending a lower portion of the center pillar outer member upper portion of the roof rail outer plate toward the vehicle interior, to the recessed portion, and the coupling recessed portion is disposed at substantially the same height as a front door opening upper edge and a rear door opening upper edge to which the front upper seal and the rear upper seal are respectively mounted and which are included in the roof side rail.

Advantageous Effects of Invention

In the first aspect of the invention, the center pillar outer member of the center pillar is divided into the two portions, i.e., the center pillar outer member upper portion and the center pillar outer member lower portion and the vehicle body side structure includes the coupling recessed portion where the center pillar outer member lower portion is coupled to the center pillar outer member upper portion and the seal member for covering the coupling recessed portion. The seal member is continuous with the front upper seal and the rear upper seal, along the roof side rail, of the front door opening seal and the rear door opening seal. Therefore, the seal member is continuous with the door opening seal and aligned with the door opening seal in a height direction of a vehicle. The seal member can be provided continuously with the door opening seal, which avoids a feeling of strangeness caused by an outward appearance of the coupling recessed portion and improves visual quality.

In second aspect of the invention, the seal member includes the main body portion, the first lip portion, and the second lip portion. The seal line area of the seal member to which the door seal on the side of the door comes in contact is formed to have the smooth surface shape without the steps from the main body portion to the tip end of the first lip portion and the tip end of the second lip portion and between the tip ends and the center pillar outer member and the remaining tip end other than the tip ends in the seal line area is formed to be thick-walled. Because the tip end is thick-walled, shapes of the thin tip ends in the seal line area can be maintained, falling off of the thin tip ends in the seal line area from the outer face of the center pillar outer member upper portion and the outer face of the center pillar outer member lower portion can be suppressed, and the tip ends in the seal line area can be brought into close contact with the outer faces.

In the third aspect of the invention, the seal member is stuck to the coupling recessed portion, which facilitates a mounting operation of the seal member.

In the fourth aspect of the invention, the seal member has one end pinched by the front door opening seal and the other end pinched by the rear door opening seal. Therefore, the one end and the other end of the seal member become less liable to fall off from the center pillar outer member and detachment of the one end and the other end can be suppressed. Moreover, a line continuous with the door opening seals becomes clearer, which further improves visual quality.

In the fifth aspect of the invention, the recessed portion is formed by pressing the upper portion of the center pillar outer member lower portion toward the vehicle interior and the roof rail coupling T-shaped portion coupled to the outer face of the stiffener of the roof side rail is formed continuously with the recessed portion. The coupling recessed portion is formed by coupling the stepped portion, formed by bending the lower portion of the center pillar outer member upper portion toward the vehicle interior, to the recessed portion. The coupling recessed portion is disposed at substantially the same height as the front door opening upper edge and the rear door opening upper edge. Therefore, it is possible to couple the upper portion of the center pillar to the stiffener (the roof side rail reinforcing member) of the roof side rail without reducing an area of the closed section extending to the upper portion of the center pillar to thereby increase strength against a load input to the roof from above the roof.

Furthermore, because the coupling recessed portion is disposed at substantially the same height as the front door opening upper edge and the front door opening upper edge, a feeling of strangeness caused by an outward. appearance of the coupling recessed portion can be reduced.

DESCRIPTION OF EMBODIMENTS

A preferred embodiment of the present invention will be described in detail below with reference to the accompanying drawings.

Embodiment

Figure 1:
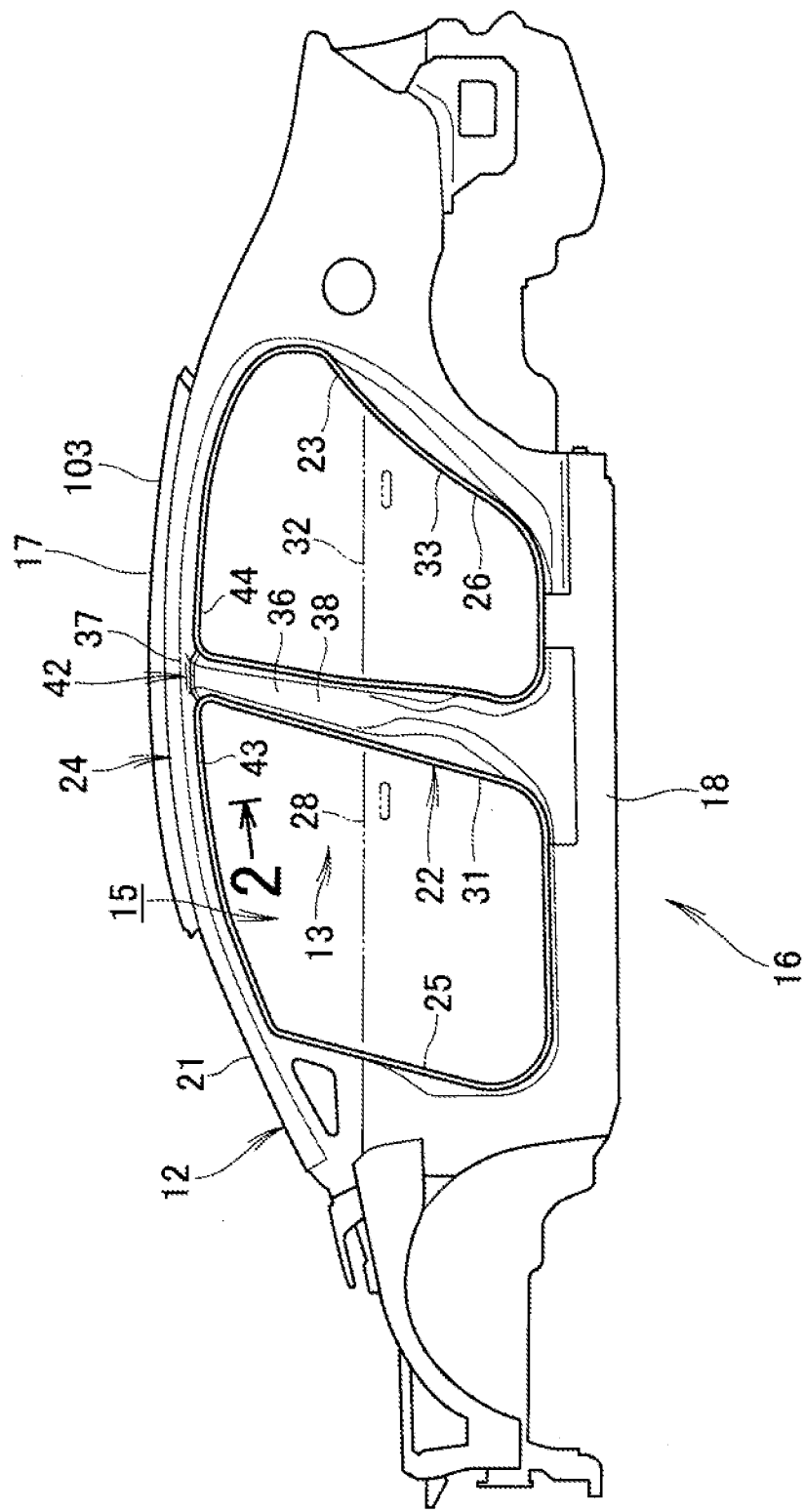
FIG. 1 is a side view illustrating a vehicle body employing a vehicle body side structure according to an embodiment of the present invention.
Figure 2:
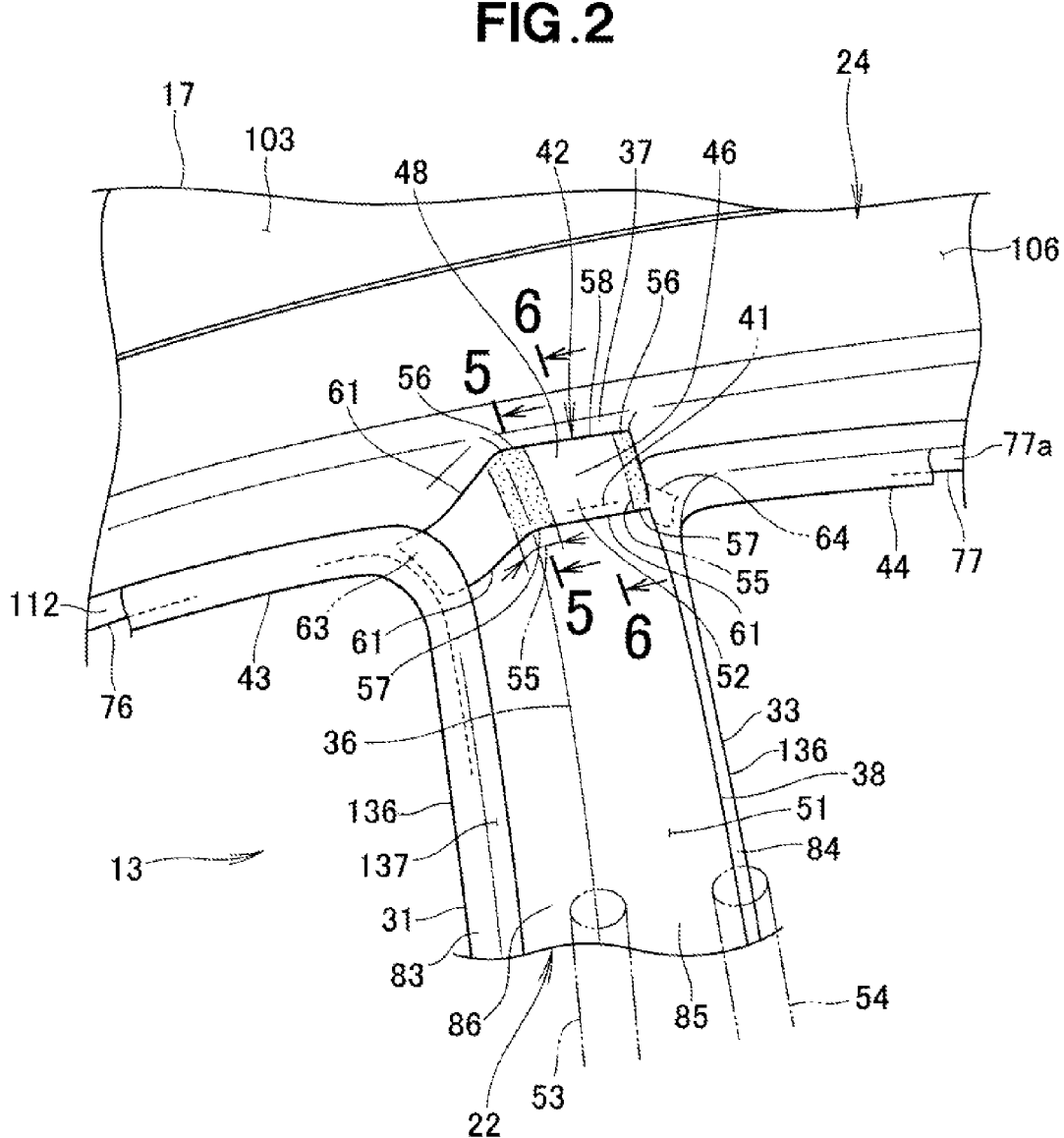
FIG. 2 is a view as seen in the direction of arrow 2 of FIG. 1.

As illustrated in FIGS. 1 and 2, a vehicle body 12 includes an underbody 16 forming a floor of a vehicle interior 15, a side body 13 forming a side wall of the vehicle interior 15, and a roof 17 supported by the side body 13.

The side body 13 includes a side sill 18, a front pillar 21 rising from the side sill 18, a center pillar 22, a rear pillar 23, and a roof side rail 24. The side body 13 has a front door opening 25 formed by the side sill 18, the pillars 21 and 22, and the roof side rail 24 and a rear door opening 26 formed by the side sill 18, the pillars 22 and 23, and the roof side rail 24.

To the front door opening 25, a front door 28 and a front door opening seal 31 are mounted. To the rear door opening 26, a rear door 32 and a rear door opening seal 33 are mounted. In this description, the front door opening seal 31 and the rear door opening seal 33 are included in the side body 13.

In the side body 13, a center pillar outer member or panel 36 of the center pillar 22 supporting the roof 17 of the vehicle body 12 is divided into two portions, i.e., a center pillar outer member upper portion 37 and a center pillar outer member lower portion 38. To the roof side rail 24 continuing from the center pillar 22 and the roof 17 and extending in a front-back direction of the vehicle body, the front door opening seal 31 and the rear door opening seal 33 corresponding to the front door 28 and the rear door 32 are mounted.

Figure 5:
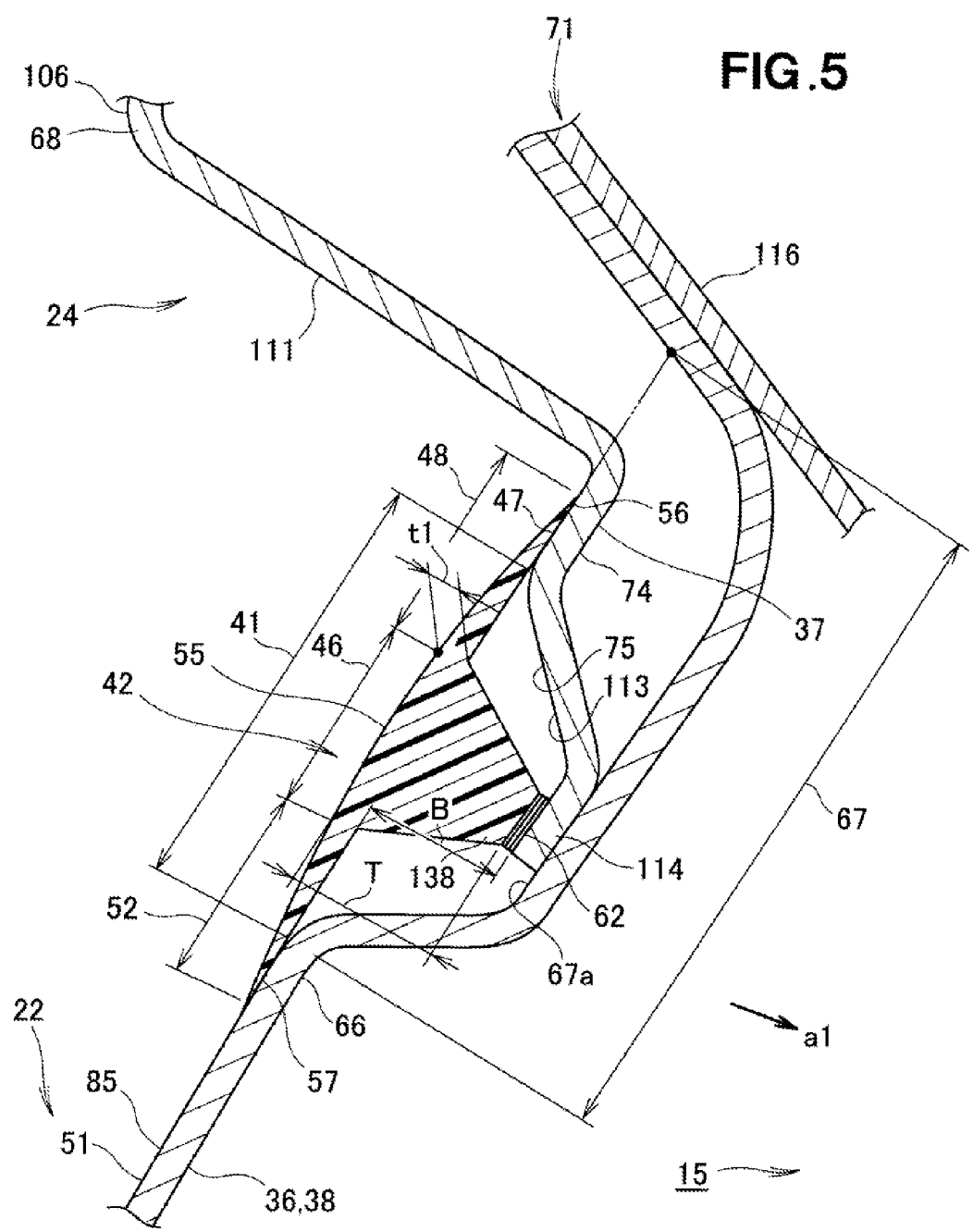
FIG. 5 is an enlarged cross-sectional view taken along line 5-5 of FIG. 2.

As illustrated in FIGS. 2 and 5, the center pillar 22 includes a coupling recessed portion 41 for coupling the center pillar outer member lower portion 38 to the center pillar outer member upper portion 37 and a seal member 42 for covering the coupling recessed portion 41.

The seal member 42 is continuous with a front upper seal 43 and a rear upper seal 44 of the front door opening seal 31 and the rear door opening seal 33 along the roof side rail 24.

Figure 6:
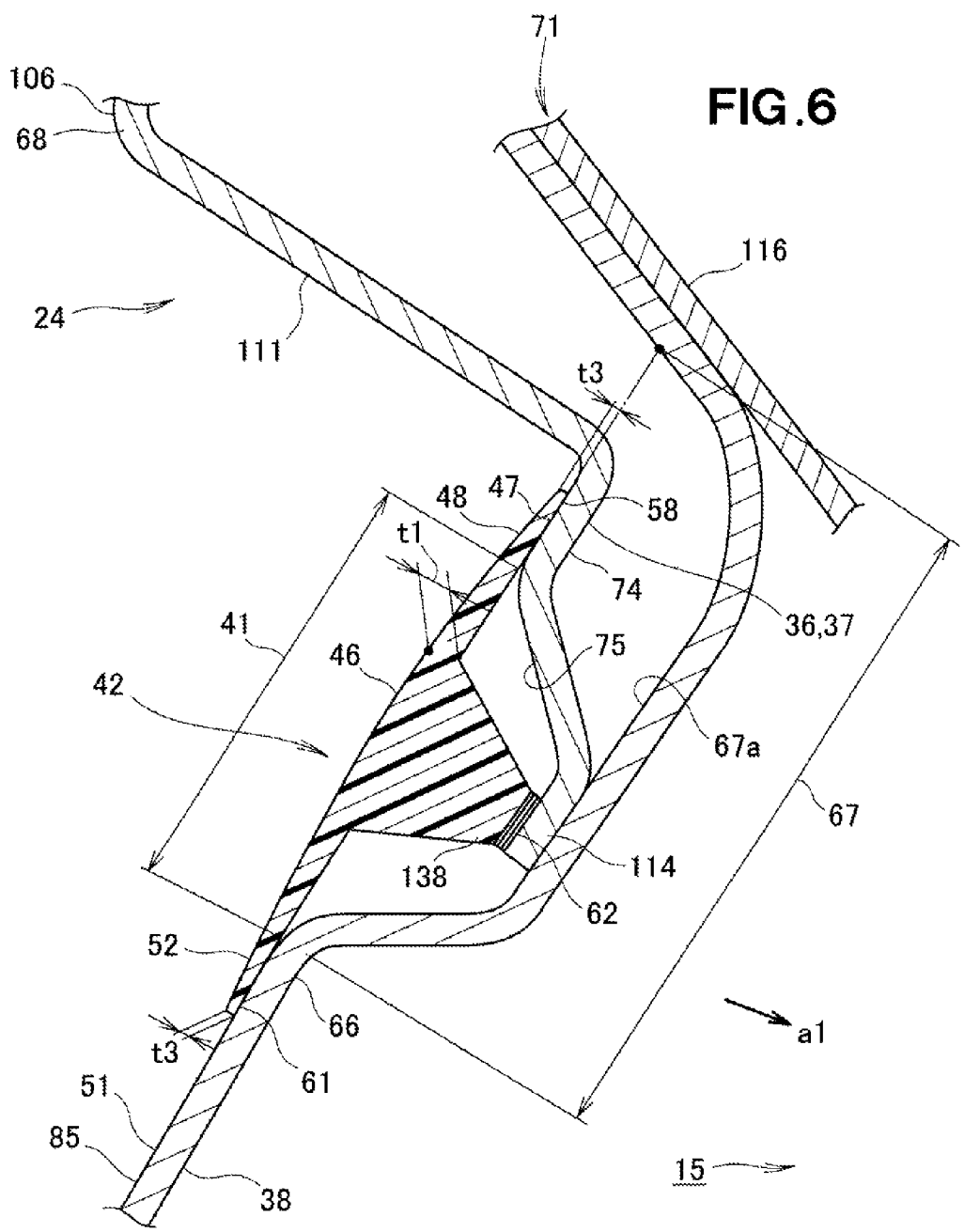
FIG. 6 is an enlarged cross-sectional view taken along line 6-6 of FIG. 2.

As illustrated in FIGS. 5 and 6, the seal member 42 includes a main body portion 46 facing the coupling recessed portion 41, a first lip portion 48 continuous with the main body portion 46 and to be laid on an outer face 47 of the center pillar outer member upper portion 37, and a second lip portion 52 continuous with the main body portion 46 and to be laid on an outer face 51 of the center pillar outer member lower portion 38.

A front door seal 53 (FIG. 2) of the front door 28 (FIG. 1) and a rear door seal 54 of the rear door 32 extending along a longitudinal direction of the center pillar outer member 36 come in close contact with the center pillar outer member 36 and come in close contact with seal line areas 55 of the seal member 42. The seal line areas 55 have smooth surface shapes without steps from the main body portion 46 to tip ends 56 of the first lip portion 48 and tip ends 57 of the second lip portion 52 and between the tip ends 56, 57 and the center pillar outer member 36. The seal line areas 55 are illustrated with dotted patterns in FIG. 2. As illustrated in FIG. 6, remaining tip ends 58 and 61 other than the tip ends 56 and 57 in the seal line areas 55 are formed to be thick-walled.

The seal member 42 is stuck to the coupling recessed portion 41. For example, the seal member 42 is stuck by using double-sided tape 62. Then, as illustrated in FIG. 2, one end 63 and the other end 64 of the seal member 42 are pinched by the front door opening seal 31 and the rear door opening seal 33.

Figure 4:
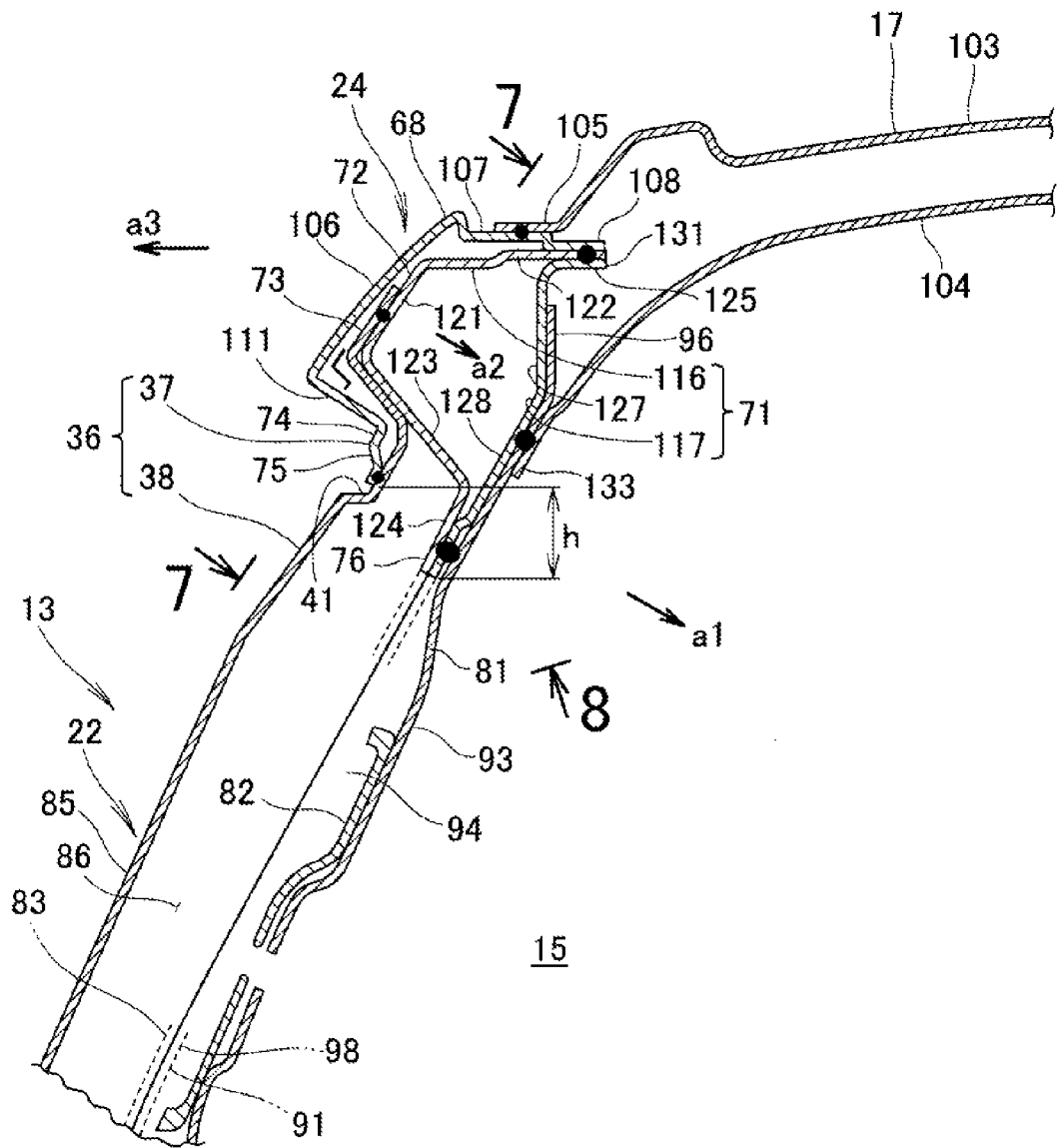
FIG. 4 is a cross-sectional view taken along line 4-4 of FIG. 3.

As illustrated in FIGS. 5 and 6, at the center pillar outer member 36, a recessed portion 67 is formed by pressing an upper portion 66 of the center pillar outer member lower portion 38 toward the vehicle interior 15 (in a direction of arrow a1). As illustrated in FIG. 4, a stiffener 71 having a closed section is continuous with the recessed portion 67, extends in a longitudinal direction of the roof side rail 24, and is provided inside a roof rail outer plate 68 of the roof side rail 24 (in a direction of arrow a2). A roof rail coupling T-shaped portion 73 is coupled to an outer face 72 of the stiffener 71. The coupling recessed portion 41 is formed by coupling a stepped portion 75, formed by bending a lower portion 74 of the center pillar outer member upper portion 37 of the roof rail outer plate 68 toward the vehicle interior 15, to the recessed portion 67.

As illustrated in FIG. 2, the coupling recessed portion 41 is disposed at substantially the same height as a front door opening upper edge 76 and a rear door opening upper edge 77 to which the front upper seal 43 and the rear upper seal 44 are respectively mounted and which are included in the roof side rail 24.

Figure 3:
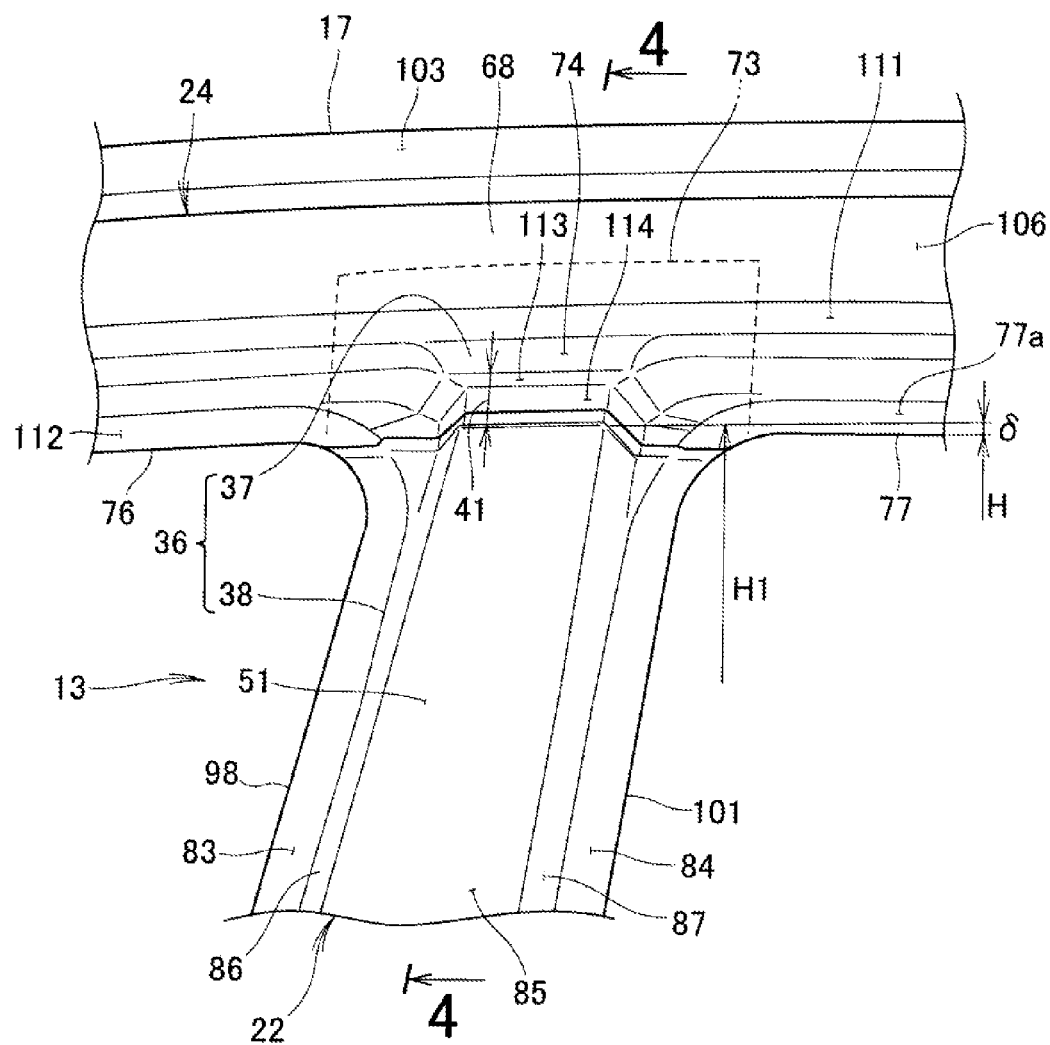
FIG. 3 is a front view illustrating a coupling recessed portion of the vehicle body side structure.

If the coupling recessed portion 41 is disposed "at substantially the same height as the front door opening upper edge 76 and the rear door opening upper edge 77", it means that, when a height of the rear door opening upper edge 77 from the side sill 18 is H and a height of the coupling recessed portion 41 from the side sill 18 is H1, H1 is higher than H by δ, but H1 is substantially the same height as H as illustrated in FIG. 3.

As illustrated in FIG. 2, the side body 13 includes the center pillar 22, the roof 17, the roof side rail 24, and the seal member 42.

Figure 7:
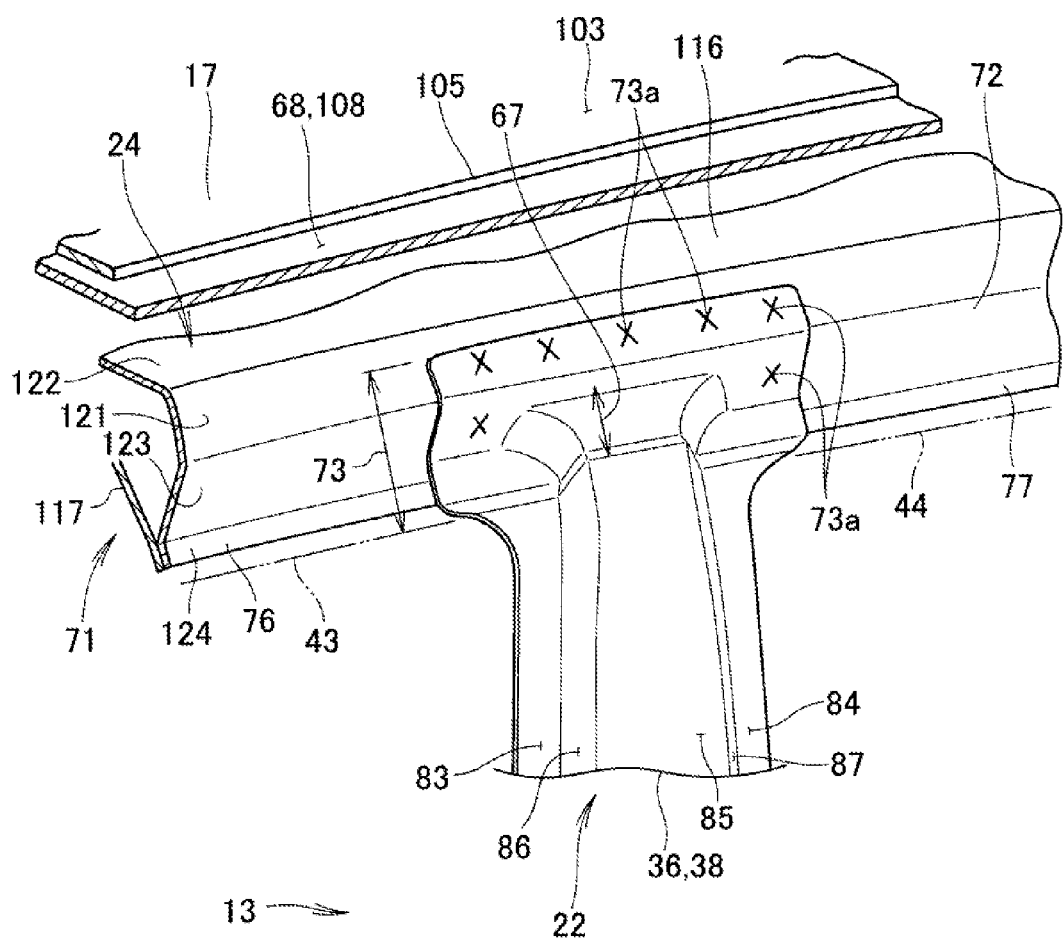
FIG. 7 is an enlarged cross-sectional view taken along line 7-7 of FIG. 4.
Figure 8:
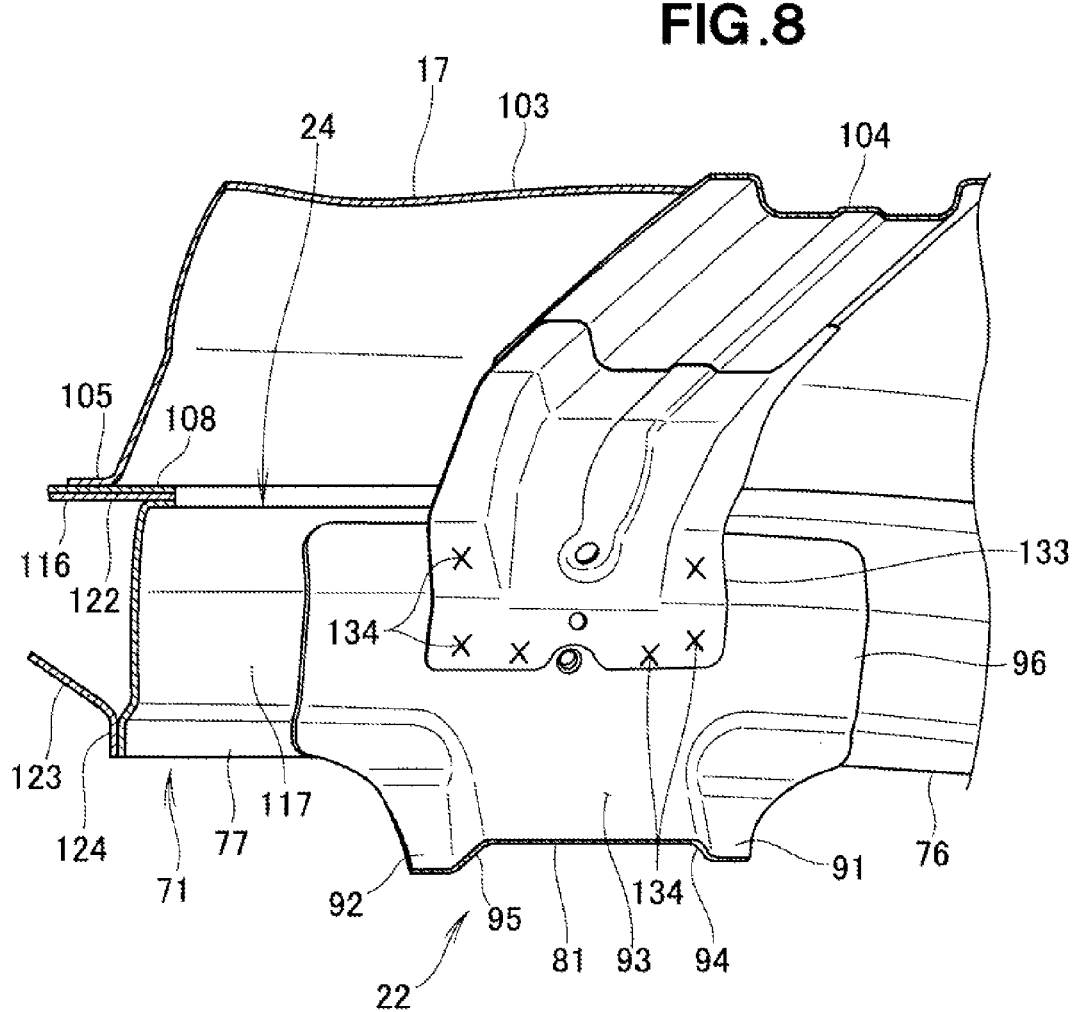
FIG. 8 is an enlarged view as seen in the direction of arrow 8 of FIG. 4.

As illustrated in FIGS. 3, 4, 7, and 8, the center pillar 22 includes the center pillar outer member 36 and a center pillar inner member 81 (FIG. 8). The center pillar outer member 36 and the center pillar inner member 81 form a closed sectional shape. A seat belt anchor mounting bracket 82 is provided in the center pillar 22.

As illustrated in FIG. 7, the center pillar outer member 36 has a hat-shaped section and includes a main body wall portion 85, a front wall portion 86 continuous with the main body wall portion 85, a rear wall portion 87, and first flanges 83 and 84 continuous with the front and rear wall portions 86 and 87. The roof rail coupling T-shaped portion 73 extends in a longitudinal direction of the stiffener 71 and is coupled to the stiffener 71 by spot welding (welded portions 73a).

As illustrated in FIG. 8, the center pillar inner member 81 has a hat-shaped section and includes a main body wall portion 93, a front wall portion 94 continuous with the main body wall portion 93, a rear wall portion 95, and second flanges 91 and 92 continuous with the front and rear wall portions 94 and 95 and respectively coupled to the first flanges 83 and 84. A roof rail coupling T-shaped portion 96 extends in a longitudinal direction of the stiffener 71 and is coupled to the stiffener 71 and the roof 17.

When the second flanges 91 and 92 are respectively coupled to the first flanges 83 and 84 of the center pillar outer member 36, the center pillar inner member 81 forms a front door opening vertical edge 98 (FIG. 3) and a rear door opening vertical edge 101 (FIG. 3) and the front door opening vertical edge 98 and the rear door opening vertical edge 101 are continuous with the roof side rail 24 of the roof 17.

As illustrated in FIGS. 2 to 4 and 8, the roof 17 includes a roof panel outer 103 and a roof arch 104. A side end portion 105 of the roof panel outer 103 is coupled to the roof side rail 24.

As illustrated in FIG. 4, the roof side rail 24 includes the roof rail outer plate 68 and the stiffener 71. The roof rail outer plate 68 includes a roof rail outer plate main body portion 106 which has an outer face facing an outside of the vehicle body 12 (in a direction of arrow a3 in FIG. 4) and a top portion 107 which is continuous with the roof rail outer plate main body portion 106, has a face oriented upward, and is coupled with the side end portion 105 of the roof panel outer 103 laid on itself. From this top portion 107, a coupling end 108 extends.

Furthermore, the roof side rail 24 includes an opening upper end portion 111 which is continuous with the roof rail outer plate main body portion 106 and has a face oriented downward, an outer flange 112 which is continuous with the opening upper end portion 111 and included in the front door opening upper edge 76, and an outer flange 77a which is included in the rear door opening upper edge 77. At a center in a longitudinal direction of the opening upper end portion 111, the center pillar outer member upper portion 37 is formed.

The center pillar outer member upper portion 37 has the stepped portion 75 formed by bending the second main body wall portion (the lower portion 74) at a center, the second main body wall portion (the lower portion 74) disposed to be an extension of the main body wall portion 85 of the center pillar outer member 36. As illustrated in FIG. 5, the stepped portion 75 has a pushed-in portion 113 formed by bending the second main body wall portion (the lower portion 74) at the center. By bending the second main body wall portion (the lower portion 74) at a position continuous with the pushed-in portion 113, a coupling edge 114 substantially parallel to the main body wall portion 85 is formed. The coupling edge 114 is coupled onto a bottom portion 67a of the recessed portion 67. The coupling edge 114 is formed at a higher position than a lower edge (the front door opening upper edge 76 and the rear door opening upper edge 77) of the stiffener 71 by a distance h (FIG. 4).

As illustrated in FIGS. 4, 7, and 8, the stiffener 71 includes a stiffener outer 116 and a stiffener inner 117.

The stiffener outer 116 has a substantially U-shaped section and includes a stiffener first wall portion 121 along the roof rail outer plate main body portion 106 of the center pillar outer member 36, a stiffener second wall portion 122 extending from the stiffener first wall portion 121 toward the roof 17, a stiffener third wall portion 123 facing the stiffener second wall portion 122, and a flange 124 continuous with the stiffener third wall portion 123. The stiffener second wall portion 122 is coupled to the coupling end 108 of the top portion 107 of the roof rail outer plate 68 by spot welding (welded portions 125).

As illustrated in FIG. 4, the stiffener inner 117 has a dogleg section and includes a stiffener fourth wall portion 127 facing the stiffener first wall portion 121 and the stiffener third wall portion 123 of the stiffener outer 116 and rising substantially vertically, a stiffener fifth wall portion 128 continuous with the stiffener fourth wall portion 127 and extending downward toward the center pillar 22, and a flange 131 orthogonal to the stiffener fourth wall portion 127 to be continuous with the stiffener fourth wall portion 127 and coupled to the coupling end 108 of the top portion 107 of the roof rail outer plate 68 with the stiffener second wall portion 122 interposed therebetween.

The stiffener fifth wall portion 128 is coupled to an end portion 133 of the roof arch 104 by spot welding (welded portions 134). An end of the stiffener fifth wall portion 128 is coupled to the flange 124 of the stiffener outer 116 and the outer flanges 112 and 77a (FIG. 3) of the roof rail outer plate 68 are coupled to the flange 124 to thereby form the front door opening upper edge 76 and the rear door opening upper edge 77.

As illustrated in FIG. 3, the front door opening seal 31 (FIG. 2) is mounted to the front door opening upper edge 76 and the front door opening vertical edge 98. The front door opening seal 31 is in an annular shape and also mounted to the side sill 18 (FIG. 1) and the front pillar 21.

The rear door opening seal 33 (FIG. 2) is mounted to the rear door opening upper edge 77 and the rear door opening vertical edge 101. The rear door opening seal 33 is in an annular shape and also mounted to the side sill 18 (FIG. 1) and the rear pillar 23.

As illustrated in FIG. 2, the front door opening seal 31 includes a grasping portion 136 for grasping the front door opening upper edge 76 and the front door opening vertical edge 98 (FIG. 3) by pinching them and a close contact portion 137 integrally continuous with the grasping portion 136 and to be pressed by the front door 28 (FIG. 1) to come in close contact with the front door 28. The rear door opening seal 33 has a similar structure to the front door opening seal 31. As already described, the front door opening seal 31 and the rear door opening seal 33 respectively retain the one end 63 and the other end 64 of the seal member 42.

As illustrated in FIG. 5, the main body portion 46 of the seal member 42 has a thickness (e.g., thickness T) corresponding to a depth of the coupling recessed portion 41. Thickness T corresponds to depth B from the main body wall portion 85 of the center pillar outer member 36 and depth B from the second main body wall portion (the lower portion 74).

A thickness of the first lip portion 48 gradually reduces from thickness t1 of the first lip portion 48 of the seal line area 55 to thickness t2 (not illustrated, e.g., 0.01 mm) of the tip end 56. A thickness of the second lip portion 52 gradually reduces from thickness t1 of the second lip portion 52 of the seal line area 55 to thickness t2 (e.g., 0.01 mm) of the tip end 57.

On the other hand, a thickness of the remaining first lip portion 48 other than the first lip portion 48 of the seal line areas 55 gradually reduces from thickness t1 to thickness t3 (e.g., 0.5 mm) of the tip end 58 (FIG. 6). In other words, t3>t2 and the tip end 58 of the remaining first lip portion 48 is thicker than the tip end 56.

A thickness of the remaining second lip portion 52 other than the second lip portion 52 of the seal line areas 55 gradually reduces from thickness t1 to thickness t3 (e.g., 0.5 mm) of the tip end 61 (FIG. 6). In other words, t3>t2 and the tip end 61 of the remaining second lip portion 52 is thicker than the tip end 57.

As illustrated in FIG. 2, the one end 63 of the seal member 42 extends to reach the front door opening vertical edge 98 (FIG. 3) and the front door opening upper edge 76 and the other end 64 of the seal member 42 extends to reach the rear door opening vertical edge 101 (FIG. 3) and the rear door opening upper edge 77.

Next, a mounting procedure of the seal member 42 will be briefly described.

First, a painting step of the vehicle body 12 is completed. Here, a coating is not illustrated. Next, as illustrated in FIGS. 5 and 6, one side of the double-sided tape 62 is stuck to an inner end 138 of the main body portion 46 of the seal member 42 and the other side of the double-sided tape 62 is stuck to a bottom (the coupling edge 114) of the coupling recessed portion 41.

Lastly, when the front door opening seal 31 and the rear door opening seal 33 are mounted to the vehicle body 12, the grasping portion 136 of the front door opening seal 31 is laid on the one end 63 of the seal member 42 to thereby pinch the one end 63. Similarly, the grasping portion 136 of the rear door opening seal 33 is laid on the other end 64 of the seal member 42 to thereby pinch the other end 84. This ends the mounting of the seal member 42.

In this manner, in the vehicle body side structure, the seal member 42 is continuous with the front upper seal 43 of the front door opening seal 31 and the rear upper seal 44 of the rear door opening seal 33 and the same in color as the door opening seal. In this manner, it is possible to avoid a feeling of strangeness caused by outward appearances of the seal member 42 and the coupling recessed portion 41 to thereby improve visual quality.

Moreover, because the seal member 42 is stuck after the vehicle body 12 is painted, it is easy to obtain the seal member 42 in the same color as the front door opening seal 31 and the rear door opening seal 33. However, it is also possible that the seal member 42 is in the same color as the center pillar 22.

Furthermore, because the remaining tip ends 58 and 61 of the seal member 42 are thick-walled (thickness t3), shapes of the thin tip ends 56 and 57 in the seal line areas 55 can be maintained, falling off of the thin tip ends 56 and 57 in the seal line areas 55 from the outer face 47 of the center pillar outer member upper portion 37 and the outer face 51 of the center pillar outer member lower portion 38 can be suppressed, and the tip ends 56 and 57 in the seal line areas 55 can be brought into close contact with the outer faces 47 and 51.

In the vehicle body side structure, as illustrated in FIG. 4, it is possible to couple the upper portion (the recessed portion 67) of the center pillar 22 to the stiffener (the roof side rail reinforcing member) 71 of the roof side rail 24 without reducing an area of the closed section extending to the upper portion (the recessed portion 67) of the center pillar 22 to thereby increase strength against a load input to the roof 17 from above the roof 17.

INDUSTRIAL APPLICABILITY

The vehicle body side structure according to the present invention is suitable for use on automobiles.

REFERENCE SIGNS LIST

12 . . . vehicle body, 13 . . . side body, 15 . . . vehicle interior, 17 . . . roof, 22 . . . center pillar, 24 . . . roof side rail, 28 . . . front door, 31 . . . front door opening seal, 32 . . . rear door, 33 . . . rear door opening seal, 36 . . . center pillar outer member, 37 . . . center pillar outer member upper portion, 38 . . . center pillar outer member lower portion, 41 . . . coupling recessed portion, 42 . . . seal member, 43 . . . front upper seal, 44 . . . rear upper seal, 46 . . . main body portion, 47 . . . outer face of center pillar outer member upper portion, 48 . . . first lip portion, 51 . . . outer face of center pillar outer member lower portion, 52 . . . second lip portion, 53 . . . front door seal, 54 . . . rear door seal, 55 . . . seal line area of seal member, 56 . . . tip end of first lip portion, 57 . . . tip end of second lip portion, 58, 61 . . . remaining tip end, 63 . . . one end of seal member, 64 . . . the other end of seal member, 66 . . . upper portion of center pillar outer member lower portion, 67 . . .

recessed portion, 68 . . . roof rail outer plate, 71 . . . stiffener, 72 . . . outer face of stiffener, 73 . . . roof rail coupling T-shaped portion, 74 . . . lower portion of center pillar outer member upper portion, 75 . . . stepped portion of center pillar outer member upper portion, 76 . . . front door opening upper edge, 77 . . . rear door opening upper edge

The invention claimed is:

1. A vehicle body side structure in which a center pillar outer member of a center pillar supporting a roof of a vehicle body is halved into a center pillar outer member upper portion and a center pillar outer member lower portion, and a front door opening seal and a rear door opening seal, corresponding respectively to a front door and a rear door, are mounted to a roof side rail continuous from the center pillar and the roof and extending in a front-back direction of the vehicle body, the vehicle body side structure comprising:

a coupling recessed portion where the center pillar outer member lower portion is coupled to the center pillar outer member upper portion; and a seal member for covering the coupling recessed portion, wherein the seal member is continuous with a front upper seal and a rear upper seal, along the roof side rail, of the front door opening seal and the rear door opening seal.

2. The vehicle body side structure according to claim 1, wherein:

the seal member includes a main body portion facing the coupling recessed portion, a first lip portion continuous with the main body portion and to be laid on an outer face of the center pillar outer member upper portion, and a second lip portion continuous with the main body portion and to be laid on an outer face of the center pillar outer member lower portion, a front door seal on a side of the door and extending along the center pillar outer member comes in close contact with the center pillar outer member, a seal line area of the seal member is formed to have a smooth surface shape without steps from the main body portion to a tip end of the first lip portion and a tip end of the second lip portion and between the tip ends and the center pillar outer member, and the tip ends, in a portion of the seal member spaced away from the seal line area, are formed to be thicker than the tip ends in the seal line area.

3. The vehicle body side structure according to claim 1, wherein the seal member is stuck to the coupling recessed portion.

4. The vehicle body side structure according to claim 1, wherein the seal member has one end pinched by the front door opening seal and the other end pinched by the rear door opening seal.

5. The vehicle body side structure according to claim 1, wherein:

the center pillar outer member lower portion has a recessed portion formed by pressing an upper portion of the center pillar outer member lower portion toward a vehicle interior, the center pillar outer member upper portion has a roof rail coupling T-shaped portion continuous with the recessed portion, extending in a longitudinal direction of the roof side rail, and coupled to an outer face of a stiffener which is provided inside a roof rail outer plate of the roof side rail, the stiffener having a closed section, the coupling recessed portion is formed by coupling a stepped portion, formed by bending a lower portion of the center pillar outer member upper portion of the roof rail outer plate toward the vehicle interior, to the recessed portion, and the coupling recessed portion is disposed at substantially the same height as a front door opening upper edge and a rear door opening upper edge to which the front upper seal and the rear upper seal are respectively mounted and which are included in the roof side rail.

* * * * *